(12) United States Patent
Kakizaki et al.

(10) Patent No.: US 8,997,837 B2
(45) Date of Patent: Apr. 7, 2015

(54) SEAL AND DRAIN STRUCTURE FOR A FRONT AND REAR INTEGRATED HVAC SYSTEM

(75) Inventors: Shinji Kakizaki, Dublin, OH (US); Junichi Kanemaru, Upper Arlington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1665 days.

(21) Appl. No.: 12/431,422

(22) Filed: Apr. 28, 2009

(65) Prior Publication Data

US 2010/0273411 A1   Oct. 28, 2010

(51) Int. Cl.
*B60H 1/04* (2006.01)
*B60H 1/00* (2006.01)
*B60H 1/32* (2006.01)

(52) U.S. Cl.
CPC .......... *B60H 1/00064* (2013.01); *B60H 1/3233* (2013.01); *B60H 2001/00099* (2013.01); *B60H 2001/00135* (2013.01); *B60H 2001/002* (2013.01)

(58) Field of Classification Search
CPC .............. B60H 1/00; B60H 1/32; B60H 3/00; B60H 2001/00; B60H 2003/00; B60H 2001/00135; B60H 2001/00507
USPC ............................................ 454/159; 62/244
See application file for complete search history.

(56) References Cited

U.S. PATENT DOCUMENTS

| | | | |
|---|---|---|---|
| 4,316,726 A * | 2/1982 | Hopper | 95/214 |
| 5,390,728 A * | 2/1995 | Ban | 165/204 |
| 5,902,181 A * | 5/1999 | Bain | 454/144 |
| 6,308,770 B1 * | 10/2001 | Shikata et al. | 165/42 |
| 6,311,763 B1 * | 11/2001 | Uemura et al. | 165/43 |
| 6,422,301 B1 * | 7/2002 | Scoccia et al. | 165/42 |
| 6,422,309 B2 * | 7/2002 | Vincent | 165/204 |
| 6,782,944 B2 * | 8/2004 | Kim et al. | 165/203 |
| 6,796,368 B1 | 9/2004 | Saida et al. | |
| 6,827,141 B2 * | 12/2004 | Smith et al. | 165/202 |
| 6,959,561 B2 | 11/2005 | Kawada et al. | |

(Continued)

FOREIGN PATENT DOCUMENTS

| | | |
|---|---|---|
| DE | 102007019382 | 10/2007 |
| EP | 0768197 | 4/1997 |

(Continued)

OTHER PUBLICATIONS

Partial European Search Report of European Application Serial No. 10161105 dated May 18, 2010.

(Continued)

*Primary Examiner* — Steven B McAllister
*Assistant Examiner* — Frances H Kamps
(74) *Attorney, Agent, or Firm* — Rankin, Hill & Clark LLP

(57) ABSTRACT

A dual-integrated HVAC system for an automotive vehicle is provided that includes a housing, a front HVAC unit with a front blower, and rear HVAC unit with a rear blower whereby both the front and rear HVAC units are housed in the housing. The front blower generates an airflow through a front airflow path and the rear blower generates an airflow through a rear airflow path. A separating wall separates the front airflow path from the rear airflow path. The HVAC system further includes an evaporator with a first portion in the front airflow path, a second portion in the rear airflow path, and a seal situated between the first portion and the second portion.

19 Claims, 6 Drawing Sheets

(56) References Cited

U.S. PATENT DOCUMENTS

| | | | |
|---|---|---|---|
| 6,959,754 B2 * | 11/2005 | Lee et al. | 165/42 |
| 7,048,036 B2 * | 5/2006 | Han | 165/43 |
| 7,284,388 B2 * | 10/2007 | Yoshida | 62/285 |
| 7,392,663 B2 * | 7/2008 | Kang et al. | 62/285 |
| 7,407,001 B2 | 8/2008 | Newman et al. | |
| 7,481,703 B2 * | 1/2009 | Okumura et al. | 454/126 |
| 8,443,872 B2 * | 5/2013 | Seto | 165/202 |
| 8,608,532 B2 * | 12/2013 | Kumar et al. | 454/141 |
| 2004/0093885 A1 * | 5/2004 | Ito et al. | 62/244 |
| 2004/0098995 A1 * | 5/2004 | Ito et al. | 62/186 |
| 2004/0206100 A1 * | 10/2004 | Tokunaga et al. | 62/179 |
| 2005/0126774 A1 * | 6/2005 | Yamaguchi et al. | 165/204 |
| 2006/0000594 A1 * | 1/2006 | Kang et al. | 165/203 |
| 2006/0065388 A1 * | 3/2006 | Newman et al. | 165/202 |
| 2006/0130509 A1 | 6/2006 | Williams et al. | |
| 2006/0242984 A1 * | 11/2006 | Kang et al. | 62/285 |
| 2007/0044950 A1 | 3/2007 | Halder et al. | |
| 2008/0003940 A1 * | 1/2008 | Haglid | 454/228 |
| 2008/0087035 A1 | 4/2008 | Kim | |
| 2008/0216502 A1 * | 9/2008 | Nakamura et al. | 62/244 |
| 2009/0058120 A1 * | 3/2009 | Ioka et al. | 296/24.34 |
| 2010/0173577 A1 * | 7/2010 | Lummitsch et al. | 454/143 |

FOREIGN PATENT DOCUMENTS

| | | | | |
|---|---|---|---|---|
| JP | 6374711 | 4/1988 | | |
| JP | 090207543 | 8/1997 | | |
| JP | 1029424 | 2/1998 | | |
| JP | 2001010327 | 1/2001 | | |
| JP | 2001315525 | 11/2001 | | |
| JP | 2003285636 | 10/2003 | | |
| JP | 2004136712 | 5/2004 | | |
| JP | 2006082725 | 3/2006 | | |
| JP | 2007126101 | 5/2007 | | |
| JP | 2007210360 | 8/2007 | | |
| JP | 2008081024 | 4/2008 | | |
| JP | 2008081029 A * | 4/2008 | | B60H 1/00 |
| JP | 2008081029 A * | 4/2008 | | |

OTHER PUBLICATIONS

Office Action of JP Serial No. 2010101635 dated May 13, 2014, 4 pages.
Office Action of JP Serial No. 2010101635 dated May 13, 2014, 4 pages, English Translation.
Office Action of JP 2010-101635 dated Jan. 21, 2014, 4 pages.
Office Action of JP 2010-101635 dated Jan. 21, 2014 (English translation), 5 pages.

* cited by examiner

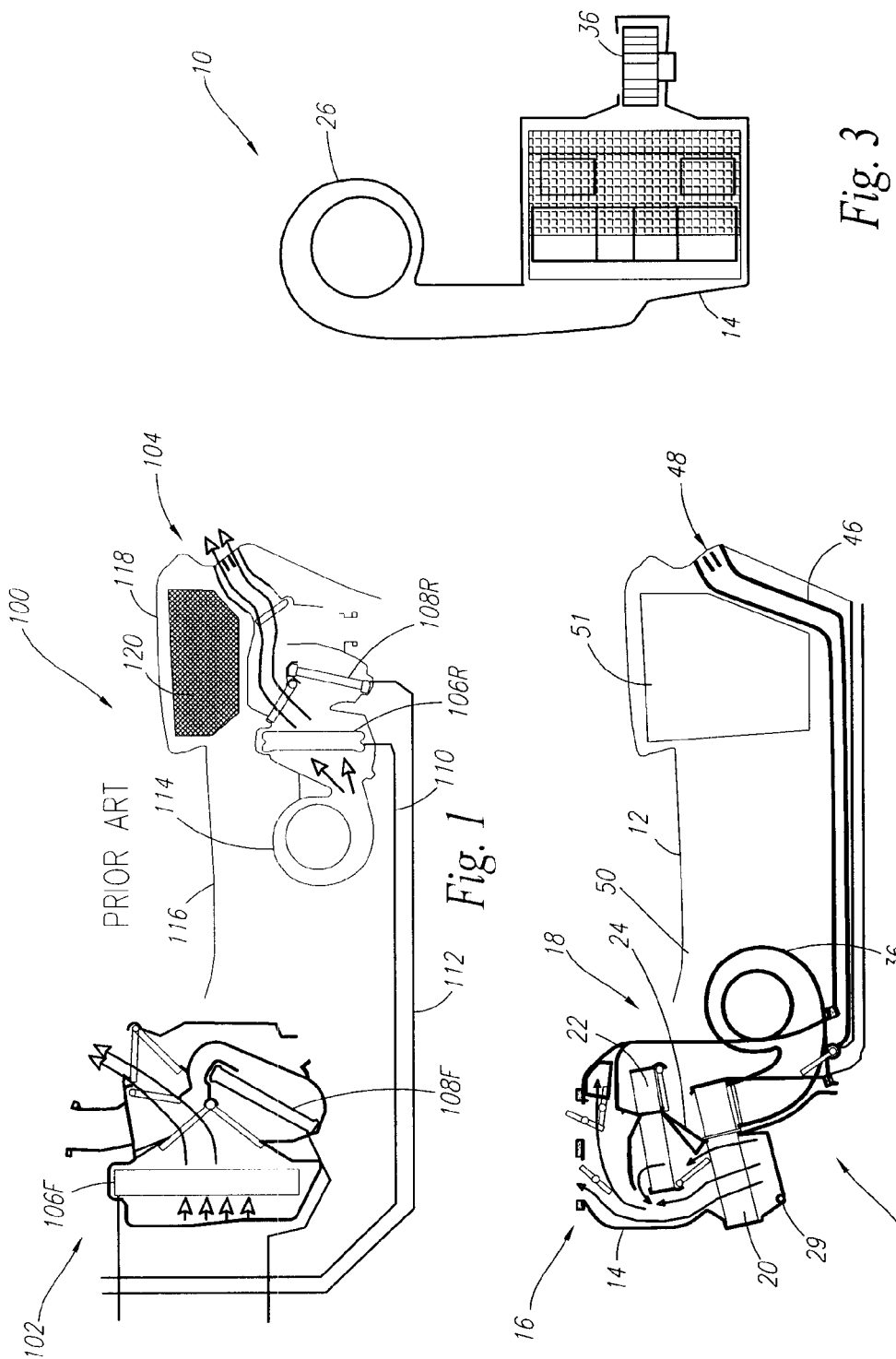

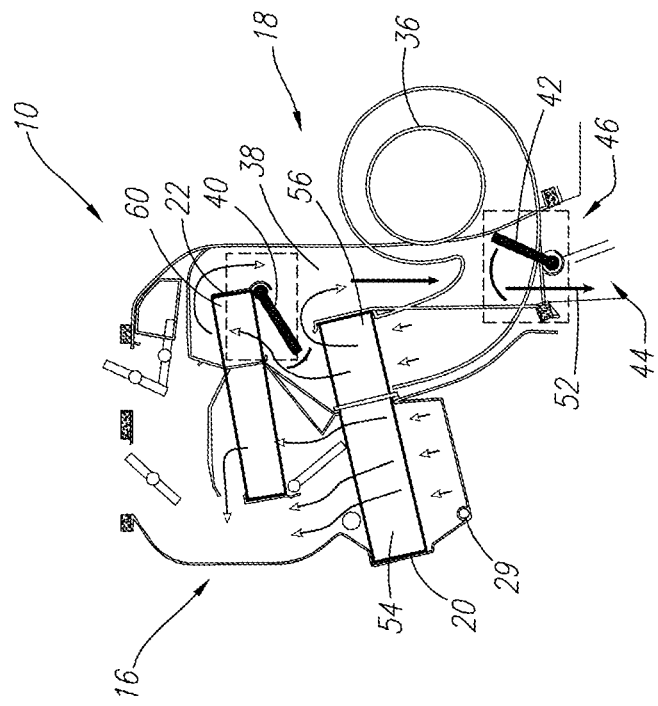
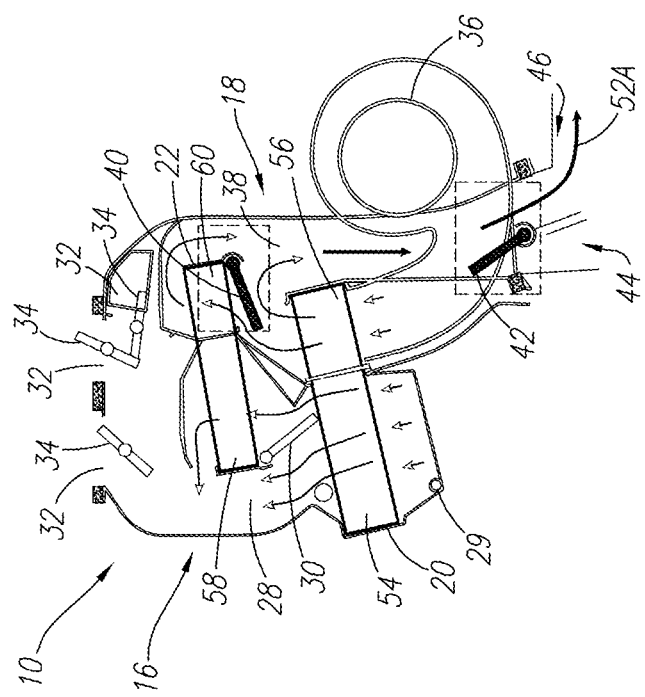

SEAL AND DRAIN STRUCTURE FOR A FRONT AND REAR INTEGRATED HVAC SYSTEM

FIELD OF THE INVENTION

The present invention relates to an HVAC system for a vehicle and more particularly to a dual HVAC system having front and rear portions.

BACKGROUND

As shown in FIG. 1, a conventional dual HVAC system 100 requires two separate HVAC units, a front HVAC unit 102 and a rear HVAC unit 104. Both the front and rear HVAC units 102, 104 are housed in separate housings, and each HVAC unit 102, 104 requires a separate evaporator 106F, 106R and a separate heating core 108F, 108R. Therefore, a major disadvantage to the conventional dual HVAC system 100 is the requirement of two housings, two evaporators, and two heater cores, which increases assembly and manufacturing costs.

Another disadvantage to the conventional dual HVAC system 100 is that the rear HVAC unit 104 requires a longer refrigerant line 110 and hot water or engine coolant line 112. As shown in FIG. 1, the rear HVAC unit 104, which includes a rear blower 114, is located in a center console 116 below an armrest 118. Thus, the rear HVAC unit 104 is located further away from an engine compartment than the front HVAC unit 102, thereby requiring longer refrigerant and hot water or engine coolant lines 110, 112. Longer lines leads to increased material and assembly costs. Further, more joints are required to run the refrigerant and the hot water or engine coolant lines 110, 112 from the engine compartment to the rear HVAC unit 104, thereby increasing the probability of fluid leaking at any one joint in each line.

Yet another disadvantage to the conventional HVAC system 100 is that the rear HVAC unit 104 occupies space in the center console 116 that can otherwise be utilized as storage space. As mentioned above, the rear HVAC unit is located in the center console 116 below the arm rest 118. A storage compartment 120 is located below the arm rest 118 and, as clearly show in FIG. 1, the rear HVAC unit 104 is located below the storage compartment 120, thereby limiting the amount of storage space in the center console 116.

Thus, what is required is a dual HVAC system that overcomes the above mentioned disadvantages.

SUMMARY

In accordance with one aspect, the present invention provides an HVAC system for a vehicle that includes a housing, a front HVAC unit and a rear HVAC unit. The front HVAC unit includes a front blower and a front airflow path. Similarly, the rear HVAC unit includes a rear blower and a rear airflow path. A separating wall prevents airflow from the front airflow path from crossing into the rear airflow path and vice versa. The HVAC system further includes an evaporator with a first portion in the front airflow path and a second portion in the rear airflow path. A seal is situated between the first portion and the second portion to prevent airflow from crossing from the first portion to the second portion and from the second portion to the first portion. A heating core is provided and also includes a first portion in the front airflow path and a second portion in the rear airflow path.

In accordance with another aspect, the present invention further includes a first-rear drain opening and a second-rear drain opening. Water condensation generated by the second portion of the evaporator drains into both the first-rear drain opening and the second-rear drain opening.

In accordance with another aspect, the present invention includes an upper drain housing affixed to the housing adjacent to the front airflow path and a lower drain housing affixed to the housing at the bottom of the front airflow path. The upper drain housing and the lower drain housing form a rear-exit drain whereby the upper drain housing directs the water condensation exiting through the first-rear drain opening to the rear-exit drain and the lower drain housing directs the water condensation exiting through the second-rear drain opening to the rear-exit drain.

In accordance with yet another aspect, the present invention further includes a water trap filter to direct all the water condensation generated by the second portion of the evaporator to the first-rear drain opening.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

FIG. 1 is a side schematic view of a conventional dual HVAC system.

FIG. 2 is a side schematic view of a dual-integrated HVAC system in accordance with the present invention.

FIG. 3 is a top view of the dual-integrated HVAC system illustrating the location of a front blower.

FIGS. 4A and 4B are schematic views of the dual-integrated HVAC system illustrating airflow patterns.

DETAILED DESCRIPTION OF THE INVENTION

Figure 5:
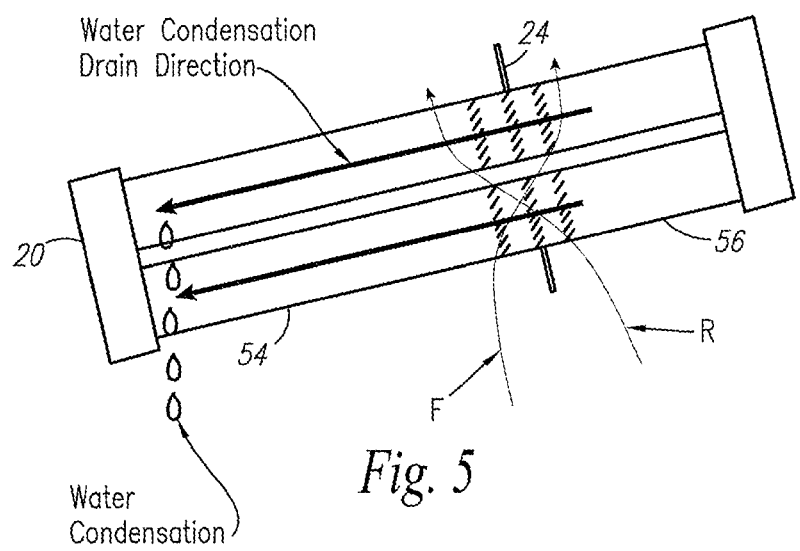
FIG. 5 is a close-up view of an evaporator.

Referring now to the drawings, FIGS. 2 and 3 show a schematic side view and an overhead view respectively of a dual-integrated HVAC system 10 (hereinafter "HVAC system") for an automotive vehicle in accordance with the present invention. The HVAC system is a dual HVAC system in that the HVAC system supplies heating and cooling air to both the front and rear of the vehicle. Further, the HVAC system is an integrated HVAC system in that the HVAC system includes a front HVAC unit and a rear HVAC unit both housed in the same housing, and require only one evaporator and one heating core for both the front and rear HVAC units. It should be noted that the evaporator and heating core of the present invention are larger than the standard evaporator and heating core for the conventional HVAC system described above. Thus, the heating/cooling efficiency and capacity of the dual-integrated HVAC system is not compromised.

Referring to FIGS. 2, 3, 4A and 4B, the HVAC system 10 is located in a dashboard area (not shown) in front of a center console 12 and includes a housing 14, a front HVAC unit 16, a rear HVAC unit 18, an evaporator 20, and a heating core 22. A separating wall 24, located in the housing 14, separates the front HVAC unit 16 from the rear HVAC unit 18. Thus, the airflow through the front HVAC unit 16 is not affected by the airflow through the rear HVAC unit 18 and vice versa.

The front HVAC unit 16 includes a front blower 26, a front (or first) airflow path 28, a front drain opening 29, a mixing door 30, and multiple airflow outlets 32 each having an airflow outlet door 34. The front blower 26 is located in the dashboard area off to the side of the HVAC system 10 behind a glove compartment (not shown), see FIG. 3. The front drain opening 29 is defined in the front airflow path 28 below the evaporator 20. Water condensation generated by the evaporator 20 exits the bottom of the vehicle via the front drain opening 29.

The mixing door 30, which is located between the evaporator 20 and the heating core 22, controls the temperature of the air through the front airflow path 28. Specifically, the mixing door 30 can be rotated to different positions to change the ratio of cold air that flows from the evaporator 20 directly to the front airflow path 28 and from the evaporator 20 through the heating core 22. The airflow from the evaporator 20 through the heating core 22 re-enters the front airflow path 28 and mixes with the cold air from the evaporator 20 to thereby form the correct temperature airflow that will exit through the multiple outlets 32. Thus, the temperature of the airflow through the front airflow path 28 and ultimately out one of the multiple airflow outlets 32 is adjusted by rotating the mixing door 30.

The rear HVAC unit 18 includes a rear blower 36, a rear airflow path 38, a first damper door 40, a second damper door 42, a rear heater outlet 44, and a vent duct outlet 46, which leads to a rear vent outlet 48. The rear blower 36 extends into a front portion 50 of the center console 12, see FIG. 2. Thus, as clearly shown in FIG. 2, the rear HVAC unit 18 does not take up significant space in the center console 12 thereby leaving a larger storage compartment 51 for the occupants.

Referring to FIGS. 4A and 4B, the first damper door 40, which is located between the evaporator 20 and the heating core 22, controls the temperature of the air through the rear airflow path 38 much like the mixing door 30 controls the temperature of the air through the front airflow path 28. Specifically, the first damper door 40 can be rotated to different positions to change the ratio of cold air that flows from the evaporator 20 directly to the rear airflow path 38 and from the evaporator 20 directly through the heating core 22. The air that flows from the evaporator 20 through the heating core 22 re-enters the rear airflow path 38 and mixes with the cold air from the evaporator 20 to thereby form air at the correct temperature that will flow out either the rear heater outlet 44 or the rear vent outlet 48. Thus, the temperature of the air flowing through the rear airflow path 38 and out either the rear heater outlet 44 or the rear vent outlet 48 is adjusted by rotating the first damper door 40.

The second damper door 42 changes a rear operating mode of the rear HVAC unit 18. When the second damper door 42 is in a left position, as shown in FIG. 4A, the rear HVAC unit 18 is in vent mode. When the rear HVAC unit 18 is in vent mode the airflow is directed into the vent outlet duct 46, as indicated by the arrow 52A in FIG. 4A, then through the vent duct outlet 46 and out the rear vent outlet 48, see FIG. 2. On the other hand, when the second damper door 42 is in a right position, as shown in FIG. 4B, the rear HVAC unit is in heat mode. When the rear HVAC unit 18 is in heat mode the airflow is directed out the rear heater outlet 44, as indicated by the arrow 52 in FIG. 4B.

As shown in FIGS. 4A and 4B, the airflow in the front airflow path 28 flows through a first portion 54 of the evaporator 20 and the airflow in the rear airflow path 38 flows through a second portion 56 of the evaporator 20. Similarly, the airflow in the front airflow path 28 flows through a first portion 58 of the heating core 22 and the airflow in the rear airflow path 38 flows through a second portion 60 of the heating core 22. Thus, the first portion 54 of the evaporator 20 and the first portion 58 of the heating core 22 are in the front airflow path 28. Similarly, the second portion 56 of the evaporator 20 and the second portion 60 of the heating core 22 are in the rear airflow path 38. Therefore, only one evaporator 20 and one heating core 22 are required for both the front 16 and rear 18 HVAC units. As mentioned above, the evaporator 20 and heating core 22 of the present invention are larger than the standard evaporator and heating core for the conventional HVAC system 100 described above. Therefore, the heating/cooling efficiency and capacity of the HVAC system 10 is not compromised.

The HVAC system 10 of the present invention prevents a leak that might otherwise occur between the front airflow path 28 and the rear airflow path 38 in the evaporator 20. Specifically, referring to FIG. 5, when the airflow flows through the first portion 54 of the evaporator 20 a portion of the airflow, represented by the arrow F, may leak over to the second portion 56 of the evaporator 20. Similarly, when the airflow flows through the second portion 56 of the evaporator 20 a portion of the airflow, represented by the arrow R, may leak over to the first portion 54 of the evaporator 20.

Figure 6:
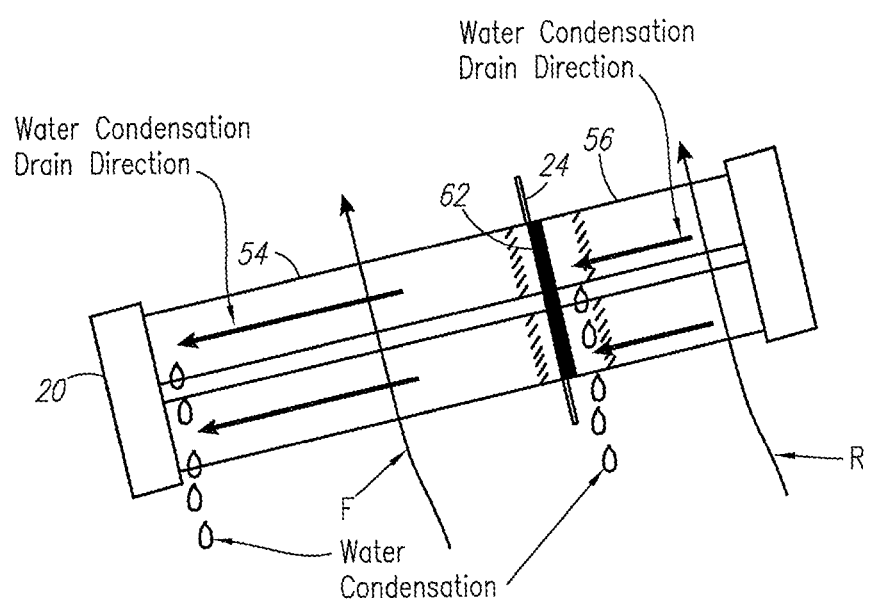
FIG. 6 is a close-up view of the evaporator including a seal.

To prevent the airflow leak in the evaporator 20 a seal 62 is situated between the first portion 54 of the evaporator 20 and the second portion 56 of the evaporator 20, see FIG. 6. The seal 62, thus, prevents the airflow in the front airflow path 28 from leaking to the rear airflow path 38 and the airflow in the rear airflow path 38 from leaking to the front airflow path 28. The seal 62 also directs the water condensation generated by the second portion 56 of the evaporator 20 downward toward the rear airflow path 38.

Figure 7A:
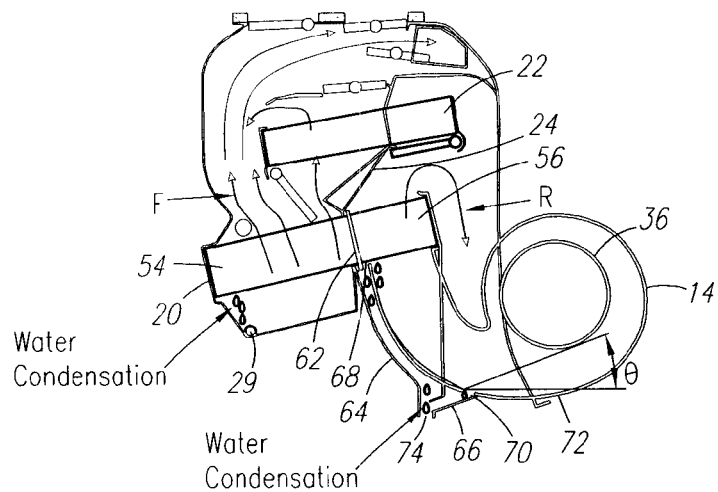
FIG. 7A is schematic view of the dual-integrated HVAC system illustrating water condensation drainage patterns.
Figure 7B:
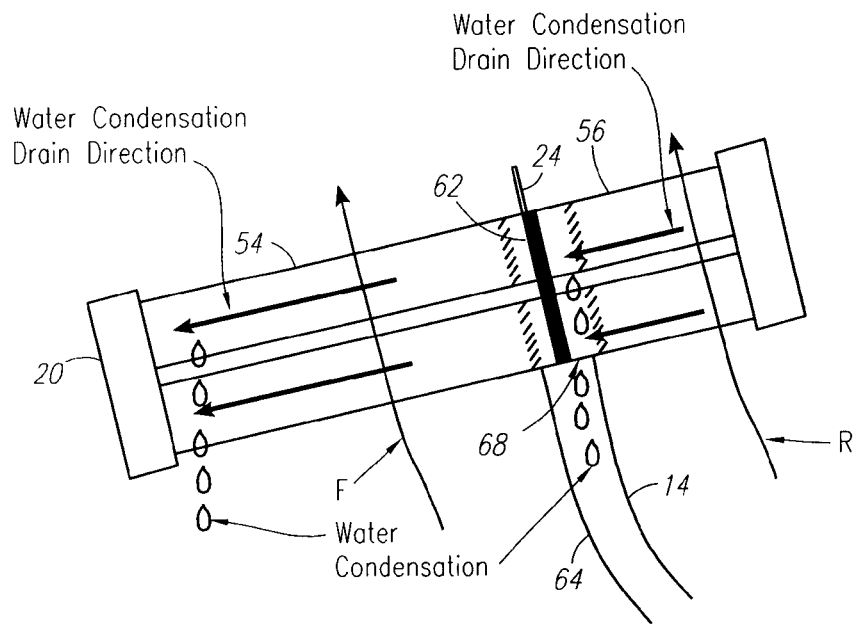
FIG. 7B is a close up view of the evaporator including the seal illustrating the arrangement of a drain housing.

To prevent the build-up of condensation in the rear air flow path 38 near the rear blower 36, the rear HVAC unit 18 further includes a drain housing that includes an upper drain housing 64 and a lower drain housing 66 both of which are affixed to the outside of the housing 14 adjacent to the rear airflow path 38, see FIGS. 7A and 7B. A first-rear drain opening 68 is defined between the upper drain housing 64 and the housing 14 adjacent to the rear airflow path 38. A second-rear drain opening 70 is also defined in the housing 14 at a bottom 72 of the rear airflow path 38 adjacent to the lower drain housing 66. The first 68 and second 70 rear drain openings allow water condensation generated by the second portion 56 of the evaporator 20 to drain from the housing 14 to a rear-exit drain 74 formed by the upper drain housing 64 and the lower drain housing 66. Thus, the upper drain housing 64 directs the water condensation exiting through the first-rear drain opening 68 to the rear-exit drain 74 and the lower drain housing 66 directs the water condensation exiting through the second-rear drain opening 70 to the rear-exit drain 74. The water condensation exits the bottom of the vehicle via the rear-exit drain 74.

Still referring to FIG. 7A, to ensure proper drainage when the vehicle is inclined, the rear blower 36 is elevated at an angle θ above a horizontal plane tangent to the bottom 72 of the housing 14 such that no water condensation enters the rear blower 36. The minimum angle to prevent water condensation from entering the rear blower 36 is approximately 17°.

Figure 8:
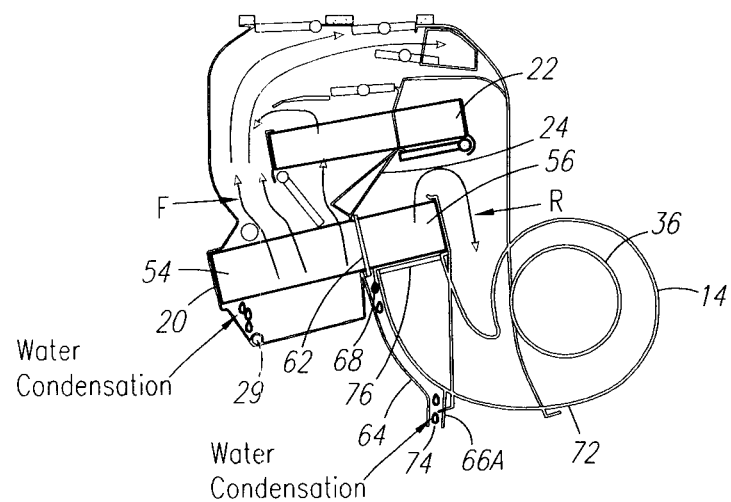
FIG. 8 is a schematic view of an alternate embodiment of FIG. 7A.

In a second embodiment, shown in FIG. 8, a water trap 76 may be inserted in the rear airflow path 38 just below the second portion 56 of the evaporator 20. The water trap 76 directs the water condensation generated by the second portion 56 of the evaporator 20 to the first-rear drain opening 68 thereby eliminating the need for the second-rear drain opening 70. The upper drain housing 64 along with an alternate lower drain housing 66A affixed to the bottom 72 of the housing 14 directs the water condensation exiting the first-rear drain opening to the rear-exit drain 74.

The HVAC system of the present invention has several advantages over the conventional HVAC system, including decreased material costs, decreased assembly costs, increased storage capacity just to list a few. In addition, comfort, convenience, and efficiency is not compromised due to the increased size of both the evaporator and heating core, as explained above.

While specific embodiments of the invention have been described and illustrated, it is to be understood that these embodiments are provided by way of example only and that the invention is not to be construed as being limited but only by proper scope of the following claims.

What is claimed is:

1. A dual-integrated HVAC system for an automotive vehicle comprising:
    a housing;
    a front HVAC unit housed in the housing and having a front blower and a front airflow path directed to a front portion of the vehicle for cooling or heating the front portion of a vehicle cabin;
    a rear HVAC unit housed in the housing and having a rear blower and a rear airflow path directed to a rear portion of the vehicle for cooling or heating the rear portion of the vehicle cabin;
    a separating wall separating the front airflow path from the rear airflow path;
    an evaporator having a first portion in the front airflow path, a second portion in the rear airflow path, and a seal situated between the first portion and the second portion to prevent airflow from crossing from the first portion to the second portion and from the second portion to the first portion; and
    a heating core having a first portion in the front airflow path and a second portion in the rear airflow path;
    wherein the rear blower extends into a front portion of a center console thereby directing the rear airflow path to the rear portion of the vehicle cabin.

2. The dual-integrated HVAC system of claim 1, wherein the separating wall and the seal both prevent airflow from the front airflow path from crossing into the rear airflow path and airflow from the rear airflow path from crossing into the front airflow path.

3. A dual-integrated HVAC system for an automotive vehicle comprising:
    a housing;
    a front HVAC unit housed in the housing and having a front blower and a front airflow path directed to a front portion of the vehicle for cooling or heating the front portion of a vehicle cabin;
    a rear HVAC unit housed in the housing and having a rear blower and a rear airflow path directed to a rear portion of the vehicle for cooling or heating the rear portion of the vehicle cabin;
    a separating wall separating the front airflow path from the rear airflow path;
    an evaporator having a first portion in the front airflow path, a second portion in the rear airflow path, and a seal situated between the first portion and the second portion, the seal adapted to direct water condensation generated by the second portion of the evaporator to flow toward the rear airflow path;
    a heating core having a first portion in the front airflow path and a second portion in the rear airflow path;
    a drain housing fixed to the housing adjacent to the rear airflow path and the seal; and
    a first-rear drain opening defined between the drain housing and the housing,
    wherein water condensation generated by the second portion of the evaporator drains into the first-rear drain opening.

4. The dual-integrated HVAC system of claim 3 further comprising a second-rear drain opening defined in the housing at a bottom of the rear airflow path, wherein water condensation generated by the second portion of the evaporator drains into the second-rear drain opening.

5. The dual-integrated HVAC system of claim 4, wherein the drain housing includes an upper drain housing affixed to the housing adjacent to the rear airflow path and a lower drain housing affixed to the housing at the bottom of the rear airflow path, wherein the upper drain housing and the lower drain housing form a rear-exit drain, and wherein the upper drain housing directs the water condensation exiting through the first-rear drain opening to the rear-exit drain and the lower drain housing directs the water condensation exiting through the second-rear drain opening to the rear-exit drain.

6. The dual-integrated HVAC system of claim 5, wherein the seal prevents airflow from the front airflow path from crossing into the rear airflow path and airflow from the rear airflow path from crossing into the front airflow path.

7. The dual-integrated HVAC system of claim 3 further comprising a water trap inserted in the rear airflow path below the second portion of the evaporator, wherein the water trap directs the water condensation generated by the second portion of the evaporator into the first-rear drain opening.

8. The dual-integrated HVAC system of claim 7 further comprising a lower drain housing affixed to the bottom of the housing, wherein the upper drain housing and the lower drain housing form a rear-exit drain, and wherein the upper drain housing and the lower drain housing direct the water condensation exiting the first-rear drain opening to the rear-exit drain.

9. The dual-integrated HVAC system of claim 1, further comprising a first conduit defined by the housing and a front drain housing affixed to a bottom of the housing, the first conduit having an inlet adjacent to the seal.

10. The dual-integrated HVAC system of claim 9, wherein the seal creates a barrier that directs water condensation generated by the second portion of the evaporator towards the inlet.

11. The dual-integrated HVAC system of claim 9, further comprising a second conduit defined by the housing in the rear airflow path and adjacent to a rear drain housing affixed to the bottom of the housing.

12. The dual-integrated HVAC system of claim 11, wherein the first conduit has a first outlet defined by the front drain housing and the housing and the second conduit has a second outlet defined in the housing at a bottom of the rear air flow path.

13. The dual-integrated HVAC system of claim 12, further comprising a rear exit drain defined between the front drain housing and the rear drain housing, wherein the first outlet and the second outlet direct water condensation generated by the second portion of the evaporator to the rear exit drain.

14. The dual-integrated HVAC system of claim 12, further comprising a water trap inserted in the rear airflow path below the second portion of the evaporator, wherein the water trap directs the water condensation generated by the second portion of the evaporator to the second outlet.

15. A method for draining water condensation generated by a dual-integrated HVAC system for a vehicle including a housing, a front HVAC unit housed in the housing and having a front blower and a front airflow path for cooling or heating a front portion of a vehicle cabin, a rear HVAC unit housed in the housing and having a rear blower and a rear airflow path for cooling or heating a rear portion of the vehicle cabin, and an evaporator having a first portion in the front airflow path and a second portion in the rear airflow path, the method comprising:

directing the front airflow path to the front portion of the vehicle cabin;

directing the rear airflow path to the rear portion of the vehicle cabin via the rear blower extending into a front portion of a center console;

providing a barrier located between the first portion and the second portion of the evaporator;

directing water condensation generated by the second portion of the evaporator via the barrier towards a first inlet adjacent to the barrier;

directing water condensation generated by the second portion of the evaporator towards a second inlet in the rear airflow path; and draining the water condensation from the first and second inlets to a rear drain opening, the rear drain opening defined between the housing and a rear drain housing fixed to the housing adjacent to the rear airflow path.

16. The method of claim 15, wherein the barrier prevents airflow from crossing between the first portion and the second portion of the evaporator.

17. The method of claim 15, wherein draining the water condensation from the first inlet further comprises directing the water condensation through a first outlet defined by a front drain housing fixed to the housing and the rear drain housing.

18. The method of claim 17, wherein draining the water condensation from the second inlet further comprises directing the water condensation through a second outlet defined in the housing at a bottom of the rear air flow path.

19. The method of claim 18, wherein the first outlet and the second outlet direct water condensation to the rear drain opening.

\* \* \* \* \*